Dec. 6, 1927.
K. E. STANT
RADIATOR CAP
Filed Feb. 15, 1926
1,652,061
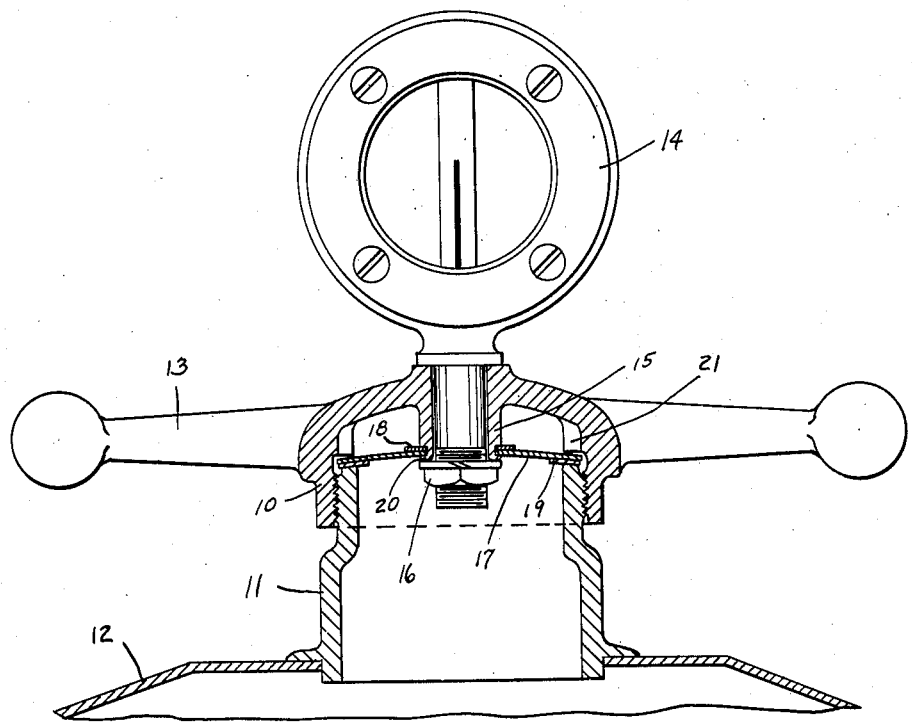
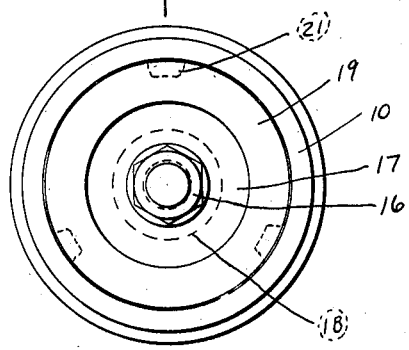
INVENTOR.
KYLE E. STANT.
BY
ATTORNEYS.

Patented Dec. 6, 1927.

1,652,061

UNITED STATES PATENT OFFICE.

KYLE E. STANT, OF CONNERSVILLE, INDIANA.

RADIATOR CAP.

Application filed February 15, 1926. Serial No. 88,354.

This invention pertains to screw threaded closures of various types, and particularly to a radiator cap for closing the filler opening at the top of an automobile radiator.

The principal object of the invention is to provide a cap of the character and for the purpose above mentioned, which will be of a simple and economical character having extreme effectiveness in mounting and long wear.

The invention contemplates the provision of a cap which may have any ornamental mounting thereon, for closing the filler spout of a radiator, the cap being provided with the usual screw threads for screwing the same in position, but having mounted thereon a spring disk with a suitable gasket which will bear against the top edge of the filler spout as the cap is screwed into position for exerting a spring pressure against the threads of the cap, thereby not only holding the cap in properly adjusted position, but forming an effective seal about the upper edge of the filler spout.

The advantages of the cap will appear from a consideration of the construction as further described, but attention may be called to the fact that by reason of the spring disk, the cap automatically aligns itself so that the ornamental parts will be in proper position with respect to the radiator, and when the cap is screwed into position, there will at all times be a spring tension holding it firmly in proper alignment. Furthermore, the disk may be so made and arranged as to permit the cap to be in aligned position upon a predetermined number of revolutions. Thus permanent alignment of the cap may be maintained regardless of possible wear of the threads or the gasket.

Another feature of the invention resides in the mounting of the spring disk within the cap so that it is rotatable with respect thereto. This prevents scraping of the gasket mounted on the disk over the top of the filler spout. When the gasket is brought into contact with the top of the filler spout, it remains stationary therewith during the continued rotation of the cap. This permits the use of a hard composition gasket, of cheaper material than the usual soft rubber gasket or cork heretofore employed. In the prior structures, as the cap is rotated into tightening position, the gasket being fixed relative thereto, would scrape over the top of the filler, whereby it would be torn or worn so as to be mutilated and disintegrated in a comparatively short time.

The full nature of the invention will be understood from the accompanying drawings and the following description and claims:

In the drawings, Figure 1 is a cross section through the cap. Fig. 2 is a plan view looking upwardly into the interior thereof from the underside.

In the drawings there is shown the usual screw cap 10 employed to close the filler spout 11 of an automobile radiator 12. Said cap, as is usually constructed, is provided with outwardly extending ornamental arms 13, and an ornamental mounting, motometer or the like 14.

The cap is screw threaded on the interior so as to screw upon the exterior screw threads of the filler spout in the usual manner, as illustrated herein, and is provided with a downwardly extending central tubular boss 15 mounted in the center thereof and extending downwardly from the top. The ornamental mounting or motometer is mounted within the tubular boss by causing the shank thereof to extend through a corresponding opening in the cap through said boss and receive the usual nut 16 for securing it in fixed position therein.

Mounted about the lower end of the boss there is a dish-shaped metal spring disk 17 which in normal position is concave with respect to its lower side or the open end of the cap. Immediately above the disk there is a "hard composition" gasket 18 formed of fibre or similar material and secured to the disk about its outer periphery on the underside thereof there is a large gasket 19 of the same material. The disk 17 and gasket 18 are held in position by turning up the lower edge on the boss at 20, whereby it will be secured thereto, but will be loosely mounted so as to freely permit rotation of the disk with respect to the boss. Immediately above the spring disk 17 there is a plurality of lugs 21 which act as a stop for limiting the upward movement of the disk if sufficient pressure is applied thereto in screwing the cap in position.

In operation, when the cap is screwed onto the spout, the concave spring disk, through the medium of the gasket 19, engages the top edge of the spout. By reason of its engagement therewith, its rotary movement with the cap is arrested and it remains stationary in contact with the spout while the cap is continued to be rotated thereabout. In screwing the cap further onto the spout, the disk is forced upwardly against the spring tension thereof until the cap is aligned in desired position with sufficient pressure exerted by the spring tension of the disk, resulting in friction of the screw threads, to maintain it against radial movement, whereby it will remain in any desired position. The spring tension thus effected by the disk will so compress the gasket against the top edge of the spout as to effect a seal for preventing leakage around the screw threads. By reason of the extent of movement of the spring disk under tension, any irregularities or wear in the screw threads or gasket will be compensated for without producing any noticeable effect upon the firmness of the cap in aligned position. It will be noted that by reason of the relative rotation, which is permissible as between the disk and cap, that there would be no scraping of the gasket over the top edge of the spout, thus eliminating any appreciable wear thereof. By properly forming the spring disk with respect to the screw threads of the cap, the cap may be so arranged as to cause it to be aligned under spring tension upon a predetermined number of revolutions, preferably one and one-half.

Whereas the invention has been above described with particular reference to a radiator cap, it is obvious that the same may be employed with respect to all closures of this character, whether for hub caps or the like, whenever it may be desired to effect a spring tension or resistance to the screw threads, as well as effect a sealing about the upper edge thereof.

The invention claimed is:

The combination with a threaded radiator filler spout, of a closure cap therefor provided with screw threads adapted to screw on said spout, a projection extending downwardly from said cap, a metallic spring disc, and means for supporting and maintaining said disc on said projection adjacent the end thereof so as to permit its free rotation but prevent movement longitudinally of said projection at substantially its center, whereby the peripheral surface of said disc will lie in position to engage the edge of said spout for exerting a pressure and resistance between the respective screw threads so as to frictionally maintain said cap in adjusted position and seal said member with respect to said cap and filler spout when in position for preventing leakage, while permitting the free rotation of said cap without relative movement between said disc and spout, said pressure being dependent entirely upon the resiliency of said disc.

In witness whereof, I have hereunto affixed my signature.

KYLE E. STANT.